US012017113B2

(12) United States Patent
Da Costa Carvalhais et al.

(10) Patent No.: US 12,017,113 B2
(45) Date of Patent: Jun. 25, 2024

(54) DEVICE FOR EXERCISING THE PELVIC FLOOR MUSCLES

(71) Applicant: UNIVERSIDADE DO PORTO, Oporto (PT)

(72) Inventors: Maria Alice Da Costa Carvalhais, Oporto (PT); Manuel Renato Natal Jorge, Oporto (PT)

(73) Assignee: UNIVERSIDADE DO PORTO, Oporto (PT)

( * ) Notice: Subject to any disclaimer, the term of this patent is extended or adjusted under 35 U.S.C. 154(b) by 573 days.

(21) Appl. No.: 17/413,589

(22) PCT Filed: Dec. 12, 2019

(86) PCT No.: PCT/IB2019/060715

§ 371 (c)(1),
(2) Date: Jun. 14, 2021

(87) PCT Pub. No.: WO2020/121247

PCT Pub. Date: Jun. 18, 2020

(65) Prior Publication Data

US 2022/0080259 A1 Mar. 17, 2022

(30) Foreign Application Priority Data

Dec. 14, 2018 (PT) .......................................... 115210

(51) Int. Cl.
*A63B 23/20* (2006.01)
*A61H 19/00* (2006.01)
(Continued)

(52) U.S. Cl.
CPC ............. *A63B 23/20* (2013.01); *A61H 19/44* (2013.01); *A61H 21/00* (2013.01); *A63B 21/0608* (2013.01); *A63B 21/065* (2013.01)

(58) Field of Classification Search
CPC ... A63B 23/20; A63B 21/0608; A63B 21/065; A63B 2220/16; A63B 2220/18;
(Continued)

(56) References Cited

U.S. PATENT DOCUMENTS 4,620,531 A * 11/1986 Dyer .................. A61B 10/0058 604/349
5,366,429 A * 11/1994 Jones ................. A63B 21/4047 482/136
(Continued)

FOREIGN PATENT DOCUMENTS

DE 29517291 U1 12/1995

*Primary Examiner* — Garrett K Atkinson
(74) *Attorney, Agent, or Firm* — Rivka Friedman

(57) ABSTRACT

The present invention relates to a device for exercising the pelvic floor muscles in women, which comprises a main component (A), a secondary component (B) and a set of external weights (P).

Figure 1:
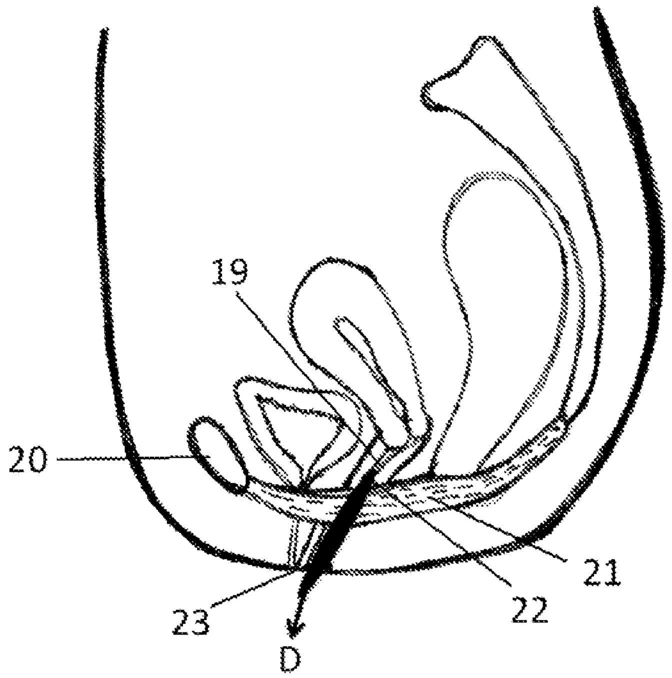

Component (A) is directly related to pelvic floor muscle contraction exercise. Component (B) allows the evaluation and monitoring of contraction exercises by measuring the displacement of a rod on a graduated ruler. The set of weights (P), with different loads, allows it to impose resistance of different magnitudes on the muscle exercises to be performed, according to the user's needs and objectives.

Thus, this invention falls within the technical field of mechanical functioning devices, with application to the medical area, for the treatment and/or prevention of pathological situations related to the alteration of the muscular function of the pelvic floor region.

8 Claims, 4 Drawing Sheets

(51) Int. Cl.
*A61H 21/00* (2006.01)
*A63B 21/06* (2006.01)
*A63B 21/065* (2006.01)

(58) Field of Classification Search
CPC ............ A63B 2220/20; A63B 2220/40; A63B 2220/56; A63B 2220/803; A61H 19/44; A61H 21/00
See application file for complete search history.

(56) References Cited

U.S. PATENT DOCUMENTS

| | | | | | |
|---|---|---|---|---|---|
| 6,068,581 | A * | 5/2000 | Anderson | A63B 23/20 | 482/148 |
| 6,217,529 | B1 * | 4/2001 | Wax | A63B 23/20 | 600/587 |
| 6,758,796 | B2 * | 7/2004 | Stein | A63B 23/20 | 482/121 |
| 6,905,471 | B2 * | 6/2005 | Leivseth | A61H 19/40 | 600/591 |
| 7,255,666 | B2 * | 8/2007 | Cardenas | A63B 7/02 | 482/69 |
| 7,686,747 | B1 * | 3/2010 | Blackford | A63B 23/20 | 482/105 |
| 8,360,954 | B2 * | 1/2013 | Kim | A61H 19/44 | 600/29 |
| 8,550,088 | B1 * | 10/2013 | Booher, Sr. | A61B 17/4241 | 128/846 |
| 10,150,001 | B1 * | 12/2018 | Blackford | A63B 21/0624 | |
| 2003/0111876 | A1 * | 6/2003 | Black | A47C 15/008 | 297/179 |
| 2003/0220589 | A1 * | 11/2003 | Leivseth | A63B 23/20 | 600/591 |
| 2004/0185991 | A1 * | 9/2004 | Bowman | A63B 23/1245 | 482/148 |
| 2008/0119338 | A1 * | 5/2008 | Prsala | A63B 23/1209 | 482/142 |
| 2008/0139876 | A1 * | 6/2008 | Kim | A61H 19/40 | 600/29 |
| 2009/0111671 | A1 * | 4/2009 | Campbell | A61M 25/10 | 604/509 |
| 2012/0053017 | A1 * | 3/2012 | Kushnir | A63B 23/20 | 482/121 |
| 2013/0281272 | A1 * | 10/2013 | Payne | A63B 21/0428 | 482/140 |

* cited by examiner

DEVICE FOR EXERCISING THE PELVIC FLOOR MUSCLES

TECHNICAL FIELD OF THE INVENTION

The present invention relates to a device to exercise the pelvic floor muscles in women, through the vaginal canal.

The device comprises a main component (A), a secondary component (B), and optionally a set of external weights (P). The main component (A) is related to the action resulting from the contraction of the pelvic floor muscles, namely the levator ani, and through which the exercises for exercising the pelvic floor muscles are performed, with or without the addition of resistant force; the secondary component (B) allows the monitoring of the exercises and monitors the correct execution of the pelvic floor muscles contraction exercise, and this monitoring is performed by quantifying the displacement of a rod, in a graduated ruler; the set of individual weights (P), with different loads, allows imposing resistance of different magnitudes to the contraction of the pelvic floor muscles The resistance applied, through this device, increases the cephalic and anterior displacement of the urethra, vagina and rectum, which promotes the closure of these structures.

In this way, the present invention falls within the technical field of mechanical functioning devices, with application to the medical area, for the treatment and prevention of pathological situations related to the loss of tone and muscle dysfunction in the pelvic floor region.

BACKGROUND OF THE INVENTION

The pelvic floor muscles have two important functions: supporting pelvic structures such as the bladder, bladder neck and urethra, and in the mechanism of the urethral sphincter. Factors associated with age, menopause, vaginal delivery, episiotomy, chronic constipation, chronic coughing and high-impact exercise have an influence on pelvic floor muscles and can alter their normal function and lead to a range of problems or dysfunctions such as urinary incontinence, pelvic organ prolapse, anal incontinence, sensory disorders of the lower urinary tract, defecatory dysfunction, sexual dysfunction and pelvic organ-related pain syndromes.

In recent years, clinical treatment, in particular pelvic floor muscle exercising, has proved effective in developing pelvic floor muscle strength.

Several devices are known for this purpose, including for instance, EDUCATOR®—Pelvic Floor Exercise Indicator, from NEEN-Performance Health, UK. This device consists of an element to be inserted into the vagina, coupled to an external indicator rod. (http://www.neenpelvichealth.com/uploads/products/neen-professional-catalogue_educator.pdf).

This device is shaped forward so that it rests on the vagina and remains there during use. When contracting the pelvic floor, the deep layer of the pelvic floor muscles should shorten and lift. This movement lifts the intravaginal element by moving the indicator rod downward toward the coccyx, indicating a correct contraction. One of the main disadvantages of EDUCATOR® is that the movement of the indicator rod always develops in favour of gravity. In addition, its plastic components, such as the flexible external indicator rod, do not make it possible to add any external weight that would impose resistance of different magnitudes on the contraction of the pelvic floor muscles. Additionally, it is not possible to quantify the displacement of said external indicator rod.

KEGELMASTER™, from Kegelmaster, USA is another device of this kind. It comprises an intravaginal handle-shaped component and a set of springs. The device, when inserted, provides resistance to contraction of the pelvic floor muscles. However, the resistance is triggered by the placement of the springs inside the intravaginal component forcing, during the exercising session, the removal of the device to change them. (https://www.kegelmaster.com/what-is-the-kegelmaster.html)

US2010/0051036 A1 discloses another device, the "Intravaginal device", which allows the application of a resistant force of different magnitudes, in order to perform the strength exercising of the pelvic floor muscles also in the standing position. However, and as illustrated in FIG. 1, the resistant force, obtained through the spring system, is performed not in the direction of the fibres of the main muscles, but in a perpendicular direction thereto.

Also known is the technique of vaginal cones, but for use in the orthostatic position, promoting the application of a resistant force, of different magnitudes, similar to the aforementioned device and, therefore, with the same disadvantages as previously mentioned.

This invention aims to overcome the aforementioned disadvantages of said techniques, proposing for that purpose, a device to exercise the pelvic floor muscles, which allows the addition of external weights, the monitoring and quantification of the resistance imposed on the muscles to exercise, rendering its removal during the exercise session unnecessary. In addition, it has the additional advantage of enhancing the cephalic and anterior displacement of the urethra, vagina and rectum, promoting the closure of these structures.

SUMMARY OF THE INVENTION

This invention relates to a device to exercise the pelvic floor muscles, in women, through the vaginal canal, useful for the treatment or prevention of pathologies related to the alteration of the muscular function of this anatomical region.

The device comprises a main component (A), a secondary component (B) and optionally a set of external weights (P).

The main component (A) is related to the anti-gravity movement and the action resulting from the contraction of the pelvic floor muscles. The resistant force, exerted by the device, is applied directly on the levator ani, relating the movement of the rod (A) only to its contraction. The resistance applied through this device simulates the one imposed by the manual reinforcement (bidigital), thus enhancing the cephalic and anterior displacement of the urethra, vagina and rectum, promoting the closure of these structures It is possible to apply a load of resistant force, through the addition of weights (P), applied to the component (A), in its extravaginal portion, thus allowing to impose a variable resistance, of different magnitudes, to the contraction of the pelvic floor muscles, and appropriate to each case and objective, without the need to remove the device during the session.

The secondary component (B) allows the monitoring of the exercises and the contraction of the pelvic floor muscles, in particular if it is performed correctly and sufficiently for the intended purpose, by measuring the displacement of a rod (H), which is quantified on a graduated ruler.

BRIEF DESCRIPTIONS OF THE DRAWINGS

Figure 2:
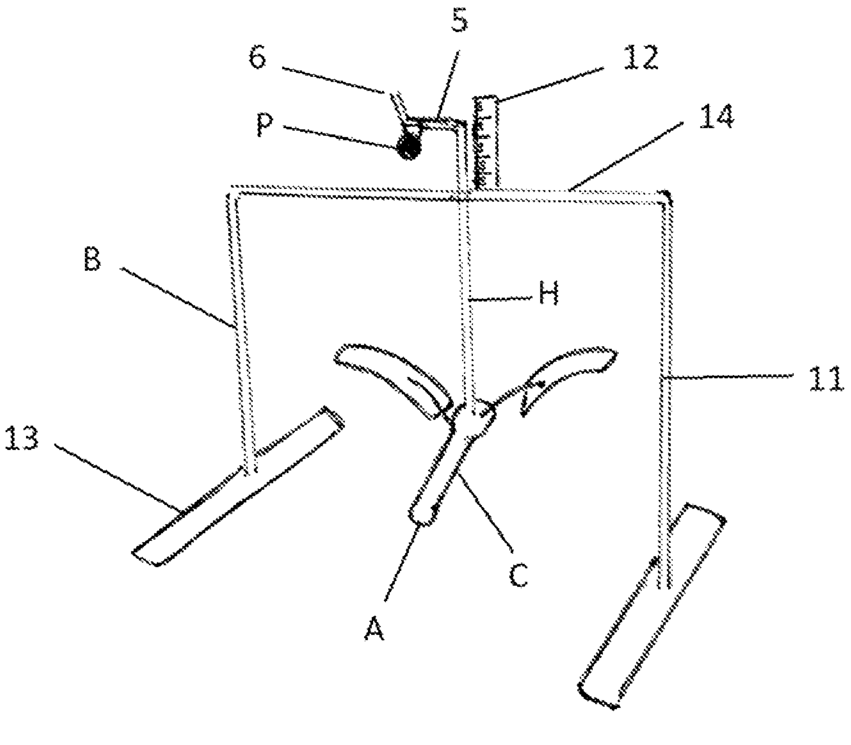

FIG. 1 shows a device of the state of the art (comparative), in which the arrow represents the action of the resistant force, obtained through a spring system, occurring in the direction perpendicular to the levator ani muscle, as is the case with the "Intravaginal device" (D), in which:

19—Vaginal canal,
20—Pubic symphysis,
21—Levator ani muscle,
22—Intravaginal portion of the main component,
23—Extravaginal portion of the main component FIG. 2 represents an antero-lateral view of the device of this invention (inventive), namely the set comprising the main component (A) and the secondary component (B), reflecting the relationship established between them when used, namely a quantification of the strength of muscle resistance that is visible to the user, in which:

A—Main component,
C—Substantially cylindrical body,
H—Rod,
5—Intermediate region of rod H,
6—Upper region of rod H,
B—Secondary component,
11—Vertical beams,
12—Graduated ruler,
13—Support bases,
14—Horizontal beam.
P—example of weight FIG. 3 refers to a postero-lateral view of component (A) of the device of the present invention, illustrating some of its different constituents, in which:

C—Cylindrical body of the main component (A),
H—Main component rod (A),
2—Intermediate portion of the body (C),
3—Extravaginal portion of the body (C),
4—Lower rod region (H),
5—Intermediate rod region (H),
6—Upper rod region (H),
7—Rigid crosspieces, connecting to supports (9),
8—Side hole, in body C, for insertion of crosspiece (7),
9—Body support (C),
10—Upper hole, in body C, for rod insertion (H).

Figure 4:
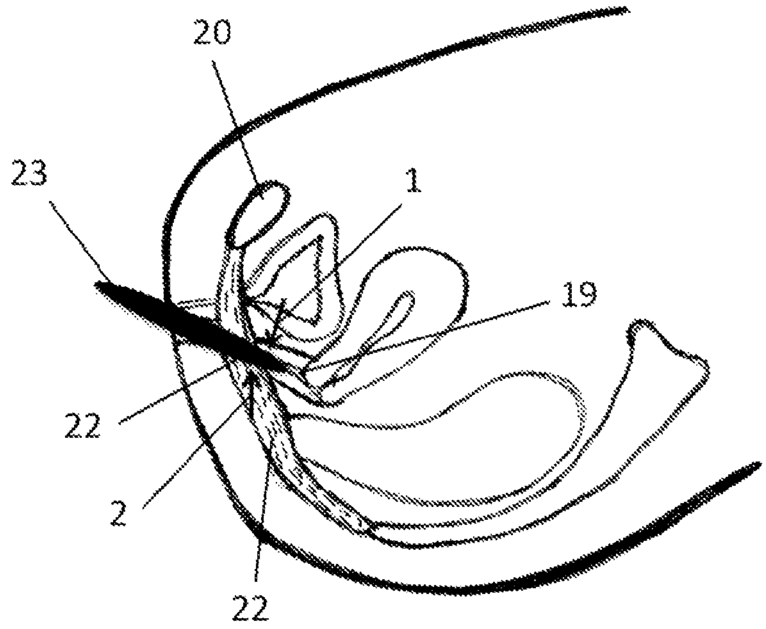

FIG. 4 shows the resistant force (arrow 1), resulting from the action of the device of the present invention, when the force is applied directly on the levator ani muscle, occurring in the direction of contraction of this muscle (arrow 2), in which:

19—Vaginal canal,
20—Pubic symphysis,
21—Levator ani muscle,
22—Intravaginal portion of the main component (A),
23—Extravaginal portion of the main component (A).

DESCRIPTION OF THE INVENTION

This invention relates to a device to exercise the pelvic floor muscles, in women, through the vaginal canal, useful for the treatment or prevention of pathologies related to the loss of muscle function in this region.

The device comprises a main component (A), a secondary component (B) and optionally a set of external weights (P).

Figure 3:
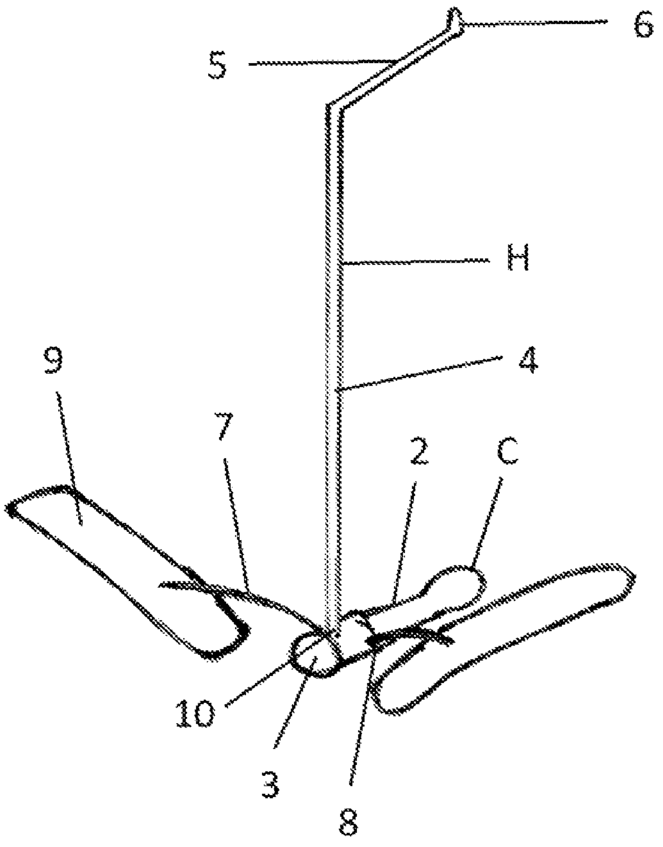

The main component (A), as shown in FIG. 3, comprises a substantially cylindrical body (C), a vertical rod (H), two crosspieces (7) and two supports (9).

The body (C) has a substantially cylindrical shape, of the type of menstrual tampons, being composed of an intravaginal portion, with a rounded tip (1) and an intermediate portion (2) and, an extravaginal portion (3).

The portions (1 and 2) of the body (C) are specially adapted to be in contact with the levator ani muscle (21), thus exerting a resistant force in the perpendicular direction on the said muscle and opposed to its contraction (arrow 1), as shown in FIG. 4.

The extravaginal portion (3) of the body (C) comprises, on its upper side, a hole (10) suitable for the insertion of the rod (H), and on each of its sides, a hole (8), which are suitable for the insertion of the crosspieces (7).

The rod (H) has a lower region (4), an intermediate region (5) and an upper region (6), inserting itself, through its lower region (4), in the hole (10) to connect mechanically with the cylindrical body (C), forming an internal angle preferably of about 100°. The lower region (4) forms an internal angle preferably of 100° with the intermediate region (5). The intermediate region (5) and the upper region (6) form an internal angle, preferably of 45°, to fit the external weights (P), which increase the resistance to contraction of the muscles of the pelvic floor of the user, generating a displacement of the rod (H) in the mid-sagittal plane of the user's body.

The pair of supports (9), have an essentially rectangular shape and slightly curved, with a concave side, so as to be supported in the antero-medial region of the user's thigh. Each of these supports (9) is attached to a rigid beam (7), through the lateral holes (8), of the body (C), in order to make the connection with the extravaginal portion (3) of said body (C). This connection is achieved by means of a 3D articulation, thus enabling the rotation in any of the three orthogonal axes.

The secondary component (B), as shown in FIG. 2, comprises two vertical beams (11), a graduated ruler (12), two support bases (13) and a horizontal beam (14).

The vertical beams (11) are rigid and adjustable in length, each comprising an upper end and a lower end.

The horizontal beam (14) is rigid, with a circular, length-adjustable section, arranged at the upper ends of each vertical beam (11) to connect them.

The support base (13), rigid and substantially rectangular in shape, is mounted on each of the lower ends of the vertical beams (11).

The ruler (12) can be graduated in mm or inches and is arranged vertically and perpendicular to the horizontal beam (14) at its midpoint. The graduated ruler (12) allows the evaluation and quantification of the displacement of the upper region (6) of the rod (H), allowing the monitoring of the different types of muscle contraction performed against resistance (concentric, eccentric, isometric).

The weights (P) are placed, when necessary, in the intermediate region (5) of the rod (H), in an external location to the user's body, through a ring in the upper part of the weight.

Consequently, there is no need to remove the body (C) from the device of the invention, after its insertion into the vaginal canal, to modify the load applied to the device.

The weights (P) present different loads, to be used according to the needs and objectives to be reached, each one of them can vary between 5 and 40 g, with a 5 g gradient, being possible to associate more than 1 weight each time, as for example x, x+1, x+2 and y.

In FIG. 4, arrow 1 represents the resistant force, applied in the direction of the muscle fibers, which is obtained by the action of the device of the present invention. The movement of the body (C) is rotational, instead of the linear movement exerted by the device of the state of the art, represented in FIG. 1. Thus, the force applied through the device of invention is closer to that imposed by manual reinforcement (bidigital), enhancing, in a substantially advantageous way, the cephalic and postero-anterior displacement of the muscles mentioned above.

The device of the present invention can be made totally or partially of rigid material, such as plastic, metal, among others, preferably recyclable and light materials, so as not to induce discomfort.

The cylindrical body (C) is preferably made of rigid material, such as plastic, metal, among others, preferably recyclable and light materials, so as not to induce discomfort. It may or not be coated with sterilisable material by physical and/or chemical means, such as radiation, pressure and steam, or by contact with chemical sterilisation agents.

The application of the device may be performed by adding a disposable coating of material compatible with the vaginal mucosa, such as a condom, which allows the device to be used by one or more users.

The device comprises a coating that is easy to sanitize and sterilization substances can be applied. Its easy handling allows it to be used both in the hospital and at home.

The extravaginal portion (3) of the body (C) and each of the rigid rods (7) has a preferential angle of 45° in respect to the longitudinal axis of the cylindrical body (C).

The configuration of the secondary component (B), in the shape of an inverted U, ensures that the cylindrical body (C) does not move longitudinally, in the vaginal canal, during the execution of the exercises.

A number of embodiments of the device may also include the addition of at least one sensor, selected from the group of pressure sensors, motion sensors, rotation sensors, slope sensors, acceleration sensors, among others.

The device can also be monitored via an electronic application connected to a suitable software for this purpose.

Following the recommendations of the American College of Sports Medicine, the device can be associated with a pelvic floor muscle strength exercising program in order to develop hypertrophy, endurance or power.

The device of this invention is particularly suitable for exercising the pelvic floor muscles in users positioned in the dorsal decubitus position.

The main component (A), in particular the body (C), is related to the action resulting from the contraction of the pelvic floor muscles, which, being in direct contact with the levator ani muscle, exerts a resistant force in the perpendicular direction on that muscle and opposed to its contraction.

Its application is especially advantageous for strengthening the pelvic floor muscles, especially the levator ani, adjusting the type of contraction (isometric, concentric, eccentric) and the strength resistant to the type of exercise involved (hypertrophy, endurance, power), appropriate to the specific dysfunctions of each patient.

The main distinguishing features are as follows:

- Possibility of evaluation and qualitative and quantitative monitoring of each exercising session to strengthen the pelvic floor muscles;
- Special action directed to the levator ani muscle, by the contraction type exercised (isometric, concentric, eccentric) in reaction to the resistant force;
- Adjustment of load and type of force exerted to the intended target (hypertrophy, endurance, power), appropriate to the specific dysfunctions of each patient;
- Implementation of different loads during the same exercising session, without the need to remove the body of the device from the user's intravaginal region;
- Maintenance of the correct positioning of the body of the device, thanks to the ergonomics provided by the concave supports resting on the user's thighs.

What is claimed is:

1. A device for exercising the pelvic floor muscles, the device comprising: a main component (A) and a secondary component (B), wherein:

the main component (A) comprises a substantially cylindrical body (C), a vertical rod (H), two crosspieces (7) and two supports (9);

the body (C) having a substantially cylindrical shape and consisting of an intravaginal portion with a rounded tip (1), an intermediate portion (2), an extravaginal portion (3) having a first hole (10), and two second holes (8), one on each side, configured for insertion of the crosspieces (7);

the rod (H) having a lower region (4), an intermediate region (5), and an upper region (6), the rod (H) being inserted, through the lower region (4), in the first hole (10), to mechanically connect the rod (H) with the cylindrical body (C), the rod (H) forming an internal angle of about 100 degrees with the body (C), the lower region (4) forming an internal angle of about 100 degrees with the intermediate region (5), and the intermediate region (5) forming an internal angle of approximately 45 degrees with the upper region (6); the rod (H) having connection means for attaching external weights (P);

the two crosspieces (7) connecting body (C) to the two supports (9) by means of a 3D joint;

the two supports (9) having a curved, approximately rectangular shape with a concave side, the supports configured to be supported in the anteromedial region of the user's thigh; and the secondary component (B) comprising two vertical beams (11), a horizontal beam (14), a graduated ruler (12) and two support bases (13);

the two vertical beams (11) being rigid and adjustable in length;

the horizontal beam (14) being rigid, having a circular cross-section, and being adjustable in length and arranged at the upper ends of each vertical beam (11) so as to connect the vertical beams (11);

the ruler (12) arranged vertically and perpendicularly to the horizontal beam (14), at a midpoint thereof, and graduated in mm or inches; and the support base (13) is rigid and substantially rectangular in shape, being mounted on lower ends of each of the vertical beams (11);

wherein a resistance force applied to the body (C) is in a perpendicular direction relative to the levator ani muscle and in a direction opposite to the contraction of the muscle.

2. The device according to claim 1, comprising: a set of the external weights (P), the weights having variable loads from 5 g to 40 g, optionally in 5 g increments; the weights being connectable, individually or together, to the upper region (6) of the rod (H) of the main component (A).

3. The device according to claim 1, wherein the device is made wholly or partly of hard material, wherein the hard material comprises thermoplastic material or metal or combinations thereof.

4. The device according to claim 3, wherein the body (C) is made of rigid polymeric material.

5. The device according to claim 3, wherein the body (C) is coated with a film of sterilizable material.

6. The device according to claim 1, further comprising one or more sensors, selected from the group consisting of: pressure sensors, motion sensors, rotation sensors, slope sensors and acceleration sensors.

7. A method of using the device of claim 1, comprising: performing at least one pelvic floor muscle exercise with the device.

8. The device as claimed in claim 1, wherein the device is configured for treatment and/or prevention of pathological situations related to the alteration of muscle function in the pelvic floor region.

* * * * *